Figure 1:
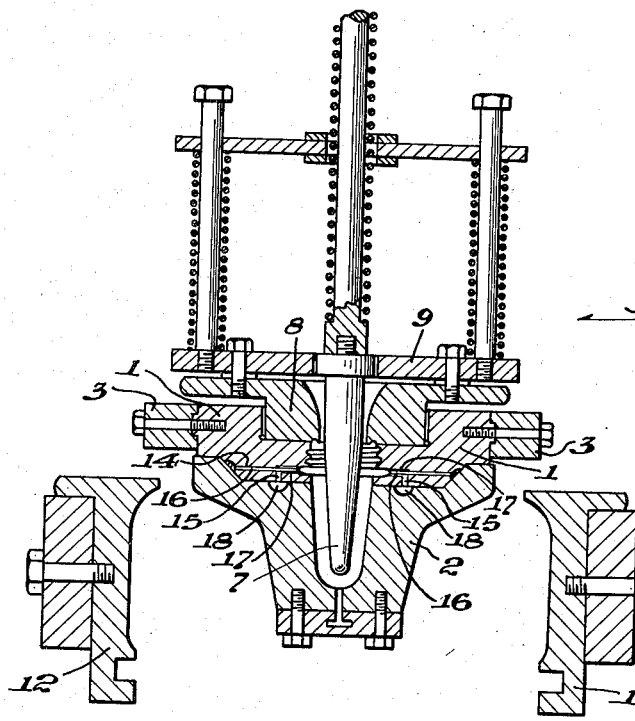

April 24, 1951     C. L. DOTSON     2,550,140

VENTED NECK MOLD

Filed May 27, 1948

INVENTOR.
CRAIG L. DOTSON.
BY
Brown, Critchlow, Flick & Peckham
his ATTORNEYS.

Patented Apr. 24, 1951

2,550,140

UNITED STATES PATENT OFFICE 2,550,140

VENTED NECK MOLD

Craig L. Dotson, Washington, Pa.

Application May 27, 1948, Serial No. 29,551

2 Claims. (Cl. 49—71)

The invention relates to neck molds used in the press and blow method of making glass containers whose necks are provided exteriorly with projections in the form of threads, annular rings or beads, and the like, for the attachment of closures to the containers, all of such projections being hereinafter designated as "closure attaching projections."

In the press and blow method of making such containers, whether they be of the wide, narrow neck or intermediate type, the initial step is that of pressing a parison from a gob or gather of glass. The molds used in this step include a partable blank mold and a partable neck mold, the latter being shaped to form the closure attaching projections on the container necks, and the molten glass in the molds is pressed by a reciprocating plunger. The parison then formed has a finished neck portion and an elongated, oval body blank which, subsequently, is blown in another mold to the desired container shape.

One difficulty experienced in pressing the neck of the container is that air becomes entrapped between the inner faces of the mold and the glass and, as a result, the projections formed may be irregular or so rounded and smooth that they do not provide effective closure attaching means. To avoid this, a number of neck molds have been provided with vents for the escape of entrapped air, such vents usually being cylindrical drilled passages which are made as small as possible to prevent the molten glass from entering them and forming irregularities on the container necks. These irregularities are objectionable since they may be mistaken for foreign matter by the purchaser of the container, or, if formed on the closure attaching projections, they may prevent proper sealing by the closure. For practical reasons it has been found to be impossible to drill a venting opening in the mold wall which is sufficiently small to exclude the molten glass and prevent the formation of these irregularities. The impossibility is due to the fact that, to prevent the molten glass from entering it, the opening should be not more than about .003 of an inch in diameter, and any metal drill of this small size would snap when used by machinists that finish glass making molds. As a consequence, containers continue to be produced which have imperfectly formed neck portions due either to entrapped air or to over-sized air vents.

The object of this invention is to provide a neck mold for the purposes stated with air vents that are adequate for their intended purpose but are of such attenuated form that in the parison pressing operation molten glass will not enter them.

Briefly stated, the object of the invention is achieved by drilling an opening through the mold wall and inserting and mounting within it a plug of slightly smaller cross-sectional area than the opening. As a result, the wall of the opening and the outer face of the plug form an attenuated air-venting passage that is too small to receive molten glass.

Figures 2, 3:
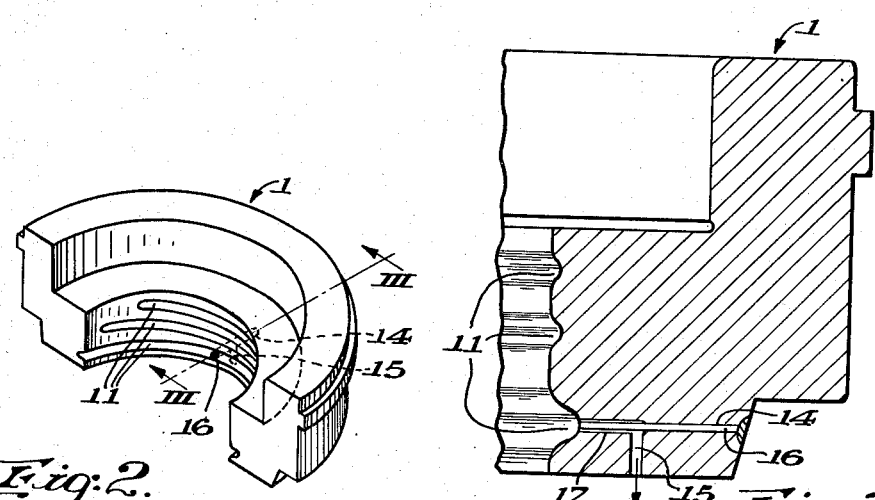

The preferred embodiment of the invention is illustrated in the accompanying drawings, in which Fig. 1 illustrates the use of a neck mold in a press and blow operation; Fig. 2 an enlarged perspective view of one-half of the mold; and Fig. 3 a section along the lines III—III of Fig. 2.

Referring particularly to Fig. 1, in a press and blow glass container molding operation, a gob or gather of glass is fed into parison forming molds, these molds including a neck-forming mold 1 that is nested in the top of a blank-forming mold 2, the neck mold being split or partable and being carried by neck mold arms 3. The gob is pressed to the shape of these molds by a vertically reciprocating plunger 7 and a plunger ring 8, the latter being carried by a spring plate 9 through which the plunger reciprocates.

The neck mold is formed of a circular wall which has its inner neck-forming surface provided with recesses 11 that form closure attaching projections upon the neck of the container, these projections being in the form of threads for screw caps, annular rings or lips for snap-on sealing lids, beads and the like. Blank mold 2 is shaped to form an elongate blank which subsequently is blown into the shape desired for the body of the container. Following the pressing operation by the plunger, the blank mold drops away from the neck mold and a blow mold 12 moves into position around the elongate blank of the parison. During this shift of molds, the machine moves the parison to another station at which the blowing operation is commenced.

The principal feature of the present invention lies in providing neck mold 1 with venting passages which are small enough to prevent molten glass from being forced into them by the reciprocating plunger. In forming such a passage, a horizontal opening 14 (Fig. 3), which may be somewhat larger than those previously used as vents, is drilled through the wall of the mold and, in addition, a vertical opening 15 is drilled up through the bottom of the mold into the horizontal opening. However, the whole of horizontal opening 14 is not used as a vent. Instead a hardened metal rod 16 is inserted into it, this rod being supported centrally therein by brazing, or otherwise securing, its outer end to the outer surface of the mold. Preferably, the outer end of horizontal opening 14 is countersunk and the rod is brazed in this countersunk portion so that the outer surface of the neck mold will rest flush against the blank mold when the two are nested. The rod is of smaller diameter than the opening so that, in effect, an attenuated, or drawn out, air escape vent 17 is provided between the periphery of the rod and the wall of the opening. The difference in size between the rod and its horizontal opening is such that the resulting vent passage permits escape of entrapped air and yet is too narrow to receive any of the molten glass being pressed. Consequently, no irregular or objectionable projections are formed in the neck of the finished container.

In practice, it has been found suitable to use a rod which is $\frac{3}{32}$ of an inch and to drill the opening .003 of an inch larger in diameter than the rod. This leaves only a .0015 inch clearance around the rod, but as will be appreciated such dimensions can be varied as desired so long as objectionable irregularities are not formed on the container necks.

Although it is preferred to use a pair of venting passages positioned as shown in Fig. 1, one such passage may suffice, or the passages may be multiplied to assure complete venting. Other variations within the contemplation of the invention will become apparent once the principles taught are understood. For instance, it is unnecessary to drill horizontal opening 14 at the particular level of the mold wall shown in the drawings, or even to drill this opening the whole way through the wall. Further, if desired, a rod, or plug, which is shorter than the opening can be used so long as the inner end of the plug is flush with the inner surface of the mold.

In use, the particular venting passages shown permit the escape of air through the bottom of the neck mold, and, since this mold is resting on a blank mold, it is desirable to provide a space to receive this vented air. This is accomplished simply by providing an annular groove or pocket 18 in the upper surface of the blank mold directly beneath vertical passage 15. In containers which have been formed by molds utilizing the principles of this invention it has been found that no irregular projections are formed on the neck and the only evidence of the vent is an almost imperceptible etched outline of the rod used.

According to the provisions of the patent statutes, I have explained the principle, construction and mode of operation of the invention, and have illustrated and described what now is considered to be the best embodiment of the invention. However, it is understood that, within the scope of the appended claims, the invention may be practiced by other forms than those specifically illustrated and described.

I claim:

1. A neck mold for use in making parisons in the press-and-blow method of manufacturing glass containers whose necks are provided exteriorly with closure-attaching projections, said mold having its molding face provided with a recess to form closure-attaching projections on parisons pressed therein, the wall of said mold being provided with an opening extending outwardly from said molding face, and a plug mounted in said opening, said plug being of uniform diameter and said wall opening having an inner extent of a diameter slightly larger than said plug diameter and an outer extent corresponding in diameter to the diameter of the plug, the wall of said larger inner extent forming with said plug an attenuated air escape vent that is too narrow to receive molten glass in parison molding operations, the wall of said outer extent of said opening holding said plug concentrically within the inner extent, and said mold also being provided with a venting passage leading from said air escape vent to atmosphere.

2. A neck mold for use in making parisons in the press-and-blow method of manufacturing glass containers whose necks are provided exteriorly with closure-attaching projections, said mold having its molding face provided with a recess to form closure-attaching projections on parisons pressed therein, the wall of said mold being provided with an opening extending outwardly from said molding face to atmosphere, and a plug mounted in said opening and secured to the mold, said plug being of uniform diameter and said wall opening having an inner extent of a diameter no greater than .003 of an inch larger than said plug diameter and an outer extent corresponding in diameter to the diameter of the plug, the wall of said larger inner extent forming with said plug an attenuated air escape vent that is too narrow to receive molten glass in parison molding operations, the wall of said outer extent of said opening holding said plug concentrically within the inner extent, and said mold also being provided with a venting passage leading from said air escape vent to atmosphere.

CRAIG L. DOTSON.

REFERENCES CITED

The following references are of record in the file of this patent:

UNITED STATES PATENTS

| Number | Name | Date |
| --- | --- | --- |
| 215,869 | Bodine | May 27, 1879 |
| 1,955,765 | Peiler | Apr. 24, 1934 |
| 2,078,919 | Bates | Apr. 27, 1937 |
| 2,266,831 | Tegarty | Dec. 23, 1941 |